(12) United States Patent
Wingert et al.

(10) Patent No.: US 8,233,623 B2
(45) Date of Patent: Jul. 31, 2012

(54) METHODS AND SYSTEMS FOR BLACKOUT PROVISIONING IN A DISTRIBUTION NETWORK

(75) Inventors: Christopher R. Wingert, Del Mar, CA (US); Pooja Aggarwal, San Diego, CA (US); Philip Michael Hawkes, Warrimoo (AU)

(73) Assignee: QUALCOMM Incorporated, San Diego, CA (US)

( * ) Notice: Subject to any disclaimer, the term of this patent is extended or adjusted under 35 U.S.C. 154(b) by 1129 days.

(21) Appl. No.: 11/744,180

(22) Filed: May 3, 2007

(65) Prior Publication Data

US 2007/0291944 A1  Dec. 20, 2007

Related U.S. Application Data

(60) Provisional application No. 60/830,547, filed on Jul. 12, 2006, provisional application No. 60/798,554, filed on May 8, 2006.

(51) Int. Cl.
*H04L 29/06* (2006.01)
(52) U.S. Cl. ............... 380/258; 726/4; 725/25; 725/31; 713/155; 713/176
(58) Field of Classification Search ........ 726/4; 725/25, 725/31; 713/176, 155
See application file for complete search history.

(56) References Cited

U.S. PATENT DOCUMENTS

| 6,560,340 | B1 | 5/2003 | Akins, III et al. |
| 7,120,254 | B2* | 10/2006 | Glick et al. ............ 380/258 |
| 7,487,349 | B2* | 2/2009 | Ksontini et al. ............ 713/163 |
| 7,958,524 | B2* | 6/2011 | Juneau ............ 725/14 |
| 2004/0034704 | A1 | 2/2004 | Connelly |
| 2005/0058291 | A1 | 3/2005 | Candelore |
| 2007/0124750 | A1* | 5/2007 | Sisodia et al. ............ 725/1 |
| 2007/0189540 | A1* | 8/2007 | Tarkkala ............ 380/277 |
| 2007/0198839 | A1* | 8/2007 | Carle et al. ............ 713/176 |

FOREIGN PATENT DOCUMENTS

EP  1331543  7/2003

(Continued)

OTHER PUBLICATIONS

FLOForum2006.0088.00 rev. 1.0; "FLO Forum Technical Specification: System Information Specification," FLOForump0001.088.00, 2006.

(Continued)

*Primary Examiner* — Vivek Srivastava
*Assistant Examiner* — Hee Song
(74) *Attorney, Agent, or Firm* — Ryan N. Farr

(57) ABSTRACT

Methods and systems for blackout provisioning in a communication network. In an aspect, a method is provided for blackout provisioning in a distribution network. The method includes determining one or more affected regions, and generating a blackout key based an original key and the affected regions. The method also includes encrypting content with the blackout key to produce encrypted content, and transmitting the encrypted content and an encrypted version of the original key over the distribution network. An apparatus is provided for blackout provisioning that includes provisioning logic to determine one or more affected regions, a key generator to generate a blackout key based an original key and the affected regions, encryption logic to encrypt content with the blackout key to produce encrypted content, and a transmitter to transmit the encrypted content and an encrypted version of the original key over the distribution network.

45 Claims, 8 Drawing Sheets

FOREIGN PATENT DOCUMENTS

| EP | 1418701 A1 | 5/2004 |
|---|---|---|
| JP | 2004528739 A | 9/2004 |
| JP | 2004306263 A | 11/2004 |
| RU | 2260918 | 9/2005 |
| RU | 2273107 | 3/2006 |
| WO | WO02054765 A1 | 7/2002 |
| WO | WO2005029858 A1 | 3/2005 |
| WO | WO2005109901 | 11/2005 |

OTHER PUBLICATIONS

Freed, et al.: "Multipurpose Internet Mail Extensions (MIME) Part Five: Conformance Criteria and Examples," RFC 2049, The Internet Engineering Task force (IETF) Request for Comments, Innosoft & First Virtual, pp. 1-23, Nov. 1996.

Freed, et al.: "Multipurpose Internet Mail Extensions (MIME) Part Four: Registration Procedures," RFC 2048, The Internet Engineering Task Force (IETF) Request for Comments, Innosoft, MCI & ISI, pp. 1-20, Nov. 1996.

Freed, et al.: "Multipurpose Internet Mail Extensions (MIME) Part One: Format of Internet Message Bodies," RFC 2045, The Internet Engineering Task Force (IETF) Request for Comments, Innosoft & First Virtual, pp. 1-29, Nov. 1996.

Freed, et al.: "Multipurpose Internet Mail Extensions (MIME) Part Two: Media Types," RFC 2046, The Internet Engineering Task Force (IETF) Request for Comments, Innosoft & First Virtual, pp. 142, Nov. 1996.

Hiden: Proposed TLA and NLA Assignment Rules, RFC 2450, The Internet Engineering Task Force (IETF) Request for Comments, Network Working Group, Category: Informational, Nokia, pp. 1-11, Dec. 1998.

Information Science Institute: "Internet Protocol, DARPA Internet Program Protocol Specification," RFC 791, The Internet Engineering Task Force (IETF) Request for Comments, pp. 1-49, Sep. 1981.

ISO 639-1; "Codes for the Representation of Names of Languages-Part 1: Alpha-2 code," International Standard, First Edition, Reference No. ISO 639-1:2002, Jul. 15, 2002.

ISO 8601; "Data elements and interchange formats-Information interchange-Representation of dates and times," International Standard, Third Edition, Reference No. ISO 8601:2004, Dec. 1, 2004.

ISO 3166-1: "Codes for the Representation of Names of Countries and their Subdivisions-Part 1: Country Codes," International Standard, Fifth Edition, Reference No. ISO 3166-1:1997, Oct. 1, 1997.

ISO/IEC 8825-2:1998; "Information Technology-ASN.1 encoding rules: Specification of Packed Encoding Rules (PER)," Technical Corrigendum 2 to International Standard ISO/IEC 8825-2:1998 was prepared by Joint Technical Committee ISO/IEC JTC 1, Information technology, Subcommittee SC 6, Telecommunications and information exchange between systems, Published Apr. 15, 2002.

ISO/IEC 14496-3; "Information Technology-Coding of Audio-Visual Objects—Part 3: Audio," International Standard, Second Edition, Reference No. ISO/IEC 14496-3:2001, Dec. 15, 2001 Part 1.

ISO/IEC 14496-3; "Information Technology-Coding of Audio-Visual Objects—Part 3: Audio," International Standard, Second Edition, Reference No. ISO/IEC 14496-3:2001, Dec. 15, 2001 Part 2.

Lauritzen, et al.: "Local Computations with Probabilities on Graphical Structures and Their Application to Expert Systems," Journal of the Royal Statistical Society, Series B (Methodological), vol. 50, pp. 157-224, No. 2, 1988.

Mockapetris: "Domain Names-Implementation and Specification," RFC 1035, The Internet Engineering Task Force (IETF) Request for Comments, Network Working Group, Information Science Instittute, pp. 1-52, Nov. 1987.

Moore: "MIME (Multipurpose Internet Mail Extensions) Part Three: Message Header Extensions for Non-ASCII Text," RFC 2047, The Internet Engineering Task Force (IETF) Request for Comments, University of Tennessee, pp. 1-15, Nov. 1996.

Postel: "User Datagram Protocol," RFC 768, The Internet Engineering Task Force (IETF) Request for Comments, Information Science Institute, pp. 1-3, Aug. 28, 1980.

Rivest: "The MD5 Message-Digest Algorithm," RFC 1321, The Internet Engineering Task Force (IETF) Request for Comments, Network Working Group, MIT Laboratory for Computer Science and RSA Data Security, Inc., pp. 1-20, Apr. 1992.

Telecommunications Industry Association: "TIA Style Manual," TIA Engineering Committee Recommendation, Internet Version, Jan. 30, 1992.

W3C Recommendation: "Extensible Markup Language (XML) 1.0 (Third Edition)," W3C Recommendation, Editors: Bray, et al., Feb. 4, 2004.

ISO/IEC 15938-5; "Information Technology-Multimedia Content Description Interface—Part 5: Multimedia description schemes," 2003.

International Preliminary Report on Patentability—PCT/US07/068231, IPEA—European Patent Office, Jan. 16, 2009.

International Search Report. PCT/US07/068231. International Search Authority. European Patent Office. May 7, 2008.

Written Opinion. PCT/US07/068231, International Search Authority, European Patent Office, May 7, 2008.

FLOForum2006.xxxx.xxx, [Enhanced H.264 video—to be supplied].

3GPP TS 26.245 v6.0.0; "3rd Generation Partnership Project; Technical Specification Group Services and System Aspects Transparent end-to-end Packet switched Streaming Service (PPS); Timed text format (Release 6)," 3GPP TS 26.245 version 6.0.0 Technical Specification, Jun. 2004.

3GPP TS 35.201 v6.1.0; "3rd Generation Partnership Project; Technical Specification Group Services and System Aspects; 3G Security; Specification of the 3GPP Confidentiality and Integrity Algroithms; Document 1: f8 and f9 Specification (Release 6)," 3GPP TS 35.201 version 6.1.0 Technical Specification, Sep. 2005.

3GPP TS 35.202 v6.1.0; "3rd Generation Partnership Project; Technical Specification Group Services and System Aspects; 3G Security; Specification of the 3GPP Confidentiality and Integrity Algorithms; Document 2: KASUMI Specification (Release 6)," 3GPP TS 35.202 version 6.1.0 Technical Specification, Sep. 2005.

ANSI X9.31-1998; "Digital Signatures Using Reversible Public Key Cryptography for the Financial Services Industry (rDSA)," American National Standard for Financial Services, Accredited Standards Committee X9, Inc., American National Standards Institute, Sep. 9, 1998.

Deering: "Host Extensions for IP Multicasting," RFC 1112, The Internet Engineering Task Force (IETF) Request for Comments, Network Working Group, Stanford University, pp. 1-16. Aug. 1989.

Deutsch: "GZIP File Format Specification Version 4.3," RFC 1952, The Internet Engineering Task Force (IETF) Request for Comments, Aladdin Enterprises, pp. 1-12, May 1996.

FIPS PUB 180-1; "Secure Hash Standard," Federal Information Processing Standards Publication (Supersedes FIPS PUB 180—May 11, 1993), U.S. Department of Commerce/National Institute of Standards and Technology, Category: Computer Security, pp. 1-24, Apr. 17, 1995.

FIPS PUB 186-2; "Digital Signature Standard (DSS)," Federal Information Processing Standards Publication, U.S. Department of Commerce/National Insititue of Standards and Technology, Category: Computer Security, pp. 1-76, Jan. 27, 2000.

FIPS PUB 197; "Advanced Encryption Standard (AES)," Federal Information Processing Standards Publication 197, pp. 1-51, Nov. 26, 2001.

FIPS PUB 198; "The Keyed-Hash Message Authentication Code (HMAC)," Federal Information Processing Standards Publication, Category: Computer Security, Subcategory: Cryptography, Information Technology Laboratory, National Institute of Standards and Technology, Issued Mar. 6, 2002.

FLOForum2006.002.02 rev. 1.1; "Forward Link Only Air Interface Specification," FLOForum-p0001.020.02, Final Approved Specification, FLO Forum Technical Contribution to TR47, 2006.

\* cited by examiner

METHODS AND SYSTEMS FOR BLACKOUT PROVISIONING IN A DISTRIBUTION NETWORK

CLAIM OF PRIORITY UNDER 35 U.S.C. §119

The present Application for Patent claims priority to Provisional Application No. 60/798,554 entitled "MEDIAFLO MULTICAST DEVICE/NETWORK INTERFACE (MDNI)" filed May 8, 2006, and Provisional Application No. 60/830,547 entitled "MULTICAST DEVICE NETWORK SYSTEM AND METHOD" filed Jul. 12, 2006, and assigned to the assignee hereof and hereby expressly incorporated by reference herein.

BACKGROUND

1. Field

The present application relates generally to the operation of data networks, and more particularly, to methods and systems for blackout provisioning in a distribution network.

2. Background

Data networks, such as wireless communication networks, have to trade off between services customized for a single terminal and services provided to a large number of terminals. For example, the distribution of multimedia content to a large number of resource limited portable devices (subscribers) is a complicated problem. Therefore, it is very important for network administrators, content retailers, and service providers to have a way to distribute content and/or other network services in a fast and efficient manner and in such a way as to increase bandwidth utilization and power efficiency.

In current content delivery/media distribution systems, foreground and background services are packed into a transmission frame and delivered to devices on a network. For example, a communication network may utilize Orthogonal Frequency Division Multiplexing (OFDM) to broadcast services from a network server to one or more mobile devices. For example, the foreground services comprise real time streaming video and/or audio that generally needs to be processed when received. The background services comprise advertisements, files or other data.

It has become increasing desirable to blackout selected content from distribution to selected regions. For example, it may be desirable to blackout the presentation of a sporting event from distribution to the region where the sporting event is taking place. This encourages the sale of tickets to the actual event.

One technique used to blackout selected content from selected regions is to prevent the transmission of the content to those regions. Unfortunately, this technique places a burden on the distribution network to precisely control how content is distributed over the network. Another problem associated with content blackout is that of device tampering. For example, if a device is tampered with, it is possible for unauthorized reception and rendering of blacked-out content to occur.

Therefore, it would be desirable to have a system that operates to provide blackout provisioning and that operates to securely blackout content in selected regions in a distribution network.

SUMMARY

In one or more aspects, a blackout system, comprising methods and apparatus, is provided that operates to securely blackout content in selected regions of a distribution network. For example, the blackout system operates to blackout selected content from selected regions in a distribution network so that the blackout is secure from device tampering.

In an aspect, a method is provided for blackout provisioning in a distribution network. The method comprises determining one or more affected regions, and generating a blackout key based an original key and the affected regions. The method also comprises encrypting content with the blackout key to produce encrypted content, and transmitting the encrypted content and an encrypted version of the original key over the distribution network.

In an aspect, an apparatus is provided for blackout provisioning in a distribution network. The apparatus comprises provisioning logic configured to determine one or more affected regions, and a key generator configured to generate a blackout key based an original key and the affected regions. The apparatus also comprises encryption logic configured to encrypt content with the blackout key to produce encrypted content, and a transmitter configured to transmit the encrypted content and an encrypted version of the original key over the distribution network.

In an aspect, an apparatus is provided for blackout provisioning in a distribution network. The apparatus comprises means for determining one or more affected regions, and means for generating a blackout key based an original key and the affected regions. The apparatus also comprises means for encrypting content with the blackout key to produce encrypted content, and means for transmitting the encrypted content and an encrypted version of the original key over the distribution network.

In an aspect, a computer program product is provided for blackout provisioning in a distribution network. The computer program product comprises a machine-readable medium that comprises a first set of codes for causing a computer to determine one or more affected regions, and a second set of codes for causing a computer to generate a blackout key based an original key and the affected regions. The machine-readable medium also comprises a third set of codes for causing a computer to encrypt content with the blackout key to produce encrypted content, and a fourth set of codes for causing a computer to transmit the encrypted content and an encrypted version of the original key over the distribution network.

In an aspect, at least one processor is provided that is configured to perform a method for blackout provisioning in a distribution network. The processor(s) comprises a first module for determining one or more affected regions, and a second module for generating a blackout key based an original key and the affected regions. The processor(s) also comprise a third module for encrypting content with the blackout key to produce encrypted content, and a fourth module for transmitting the encrypted content and an encrypted version of the original key over the distribution network.

In an aspect, a method is provided for blackout provisioning in a distribution network. The method comprises receiving a blackout message indicating that selected content has been blacked-out, and determining if a selected region is identified in the blackout message. The method also comprises indicating that the selected content is blacked out if the selected region is identified in the blackout message, and decrypting the selected content if the selected region is not identified in the blackout message.

In an aspect, an apparatus is provided for blackout provisioning in a distribution network. The apparatus comprises a receiver configured to receive a blackout message indicating that selected content has been blacked-out, and processing logic configured to determine if a selected region is identified in the blackout message. The Apparatus also comprises a user interface configured to indicate that the selected content is blacked out if the selected region is identified in the blackout message, and decryption logic configured to decrypt the selected content if the selected region is not identified in the blackout message.

In an aspect, an apparatus is provided for blackout provisioning in a distribution network. The apparatus comprises means for receiving a blackout message indicating that selected content has been blacked-out, and means for determining if a selected region is identified in the blackout message. The apparatus also comprises means for indicating that the selected content is blacked out if the selected region is identified in the blackout message, and means for decrypting the selected content if the selected region is not identified in the blackout message.

In an aspect, a computer program product is provided for blackout provisioning in a distribution network. The computer program product comprises a machine-readable medium that comprises a first set of codes for causing a computer to receive a blackout message indicating that selected content has been blacked-out, and a second set of codes for causing a computer to determine if a selected region is identified in the blackout message. The computer program produce also comprises a third set of codes for causing a computer to indicate that the selected content is blacked out if the selected region is identified in the blackout message, and a fourth set of codes for causing a computer to decrypt the selected content if the selected region is not identified in the blackout message.

In an aspect, at least one processor is provided that is configured to perform a method for blackout provisioning in a distribution network. The processor(s) comprises a first module for receiving a blackout message indicating that selected content has been blacked-out, and a second module for determining if a selected region is identified in the blackout message. The processor(s) also comprises a third module for indicating that the selected content is blacked out if the selected region is identified in the blackout message, and a fourth module for decrypting the selected content if the selected region is not identified in the blackout message.

Other aspects of the aspects will become apparent after review of the hereinafter set forth Brief Description of the Drawings, Description, and the Claims.

BRIEF DESCRIPTION OF THE DRAWINGS

The foregoing aspects described herein will become more readily apparent by reference to the following Description when taken in conjunction with the accompanying drawings wherein.

DESCRIPTION

Figure 1:
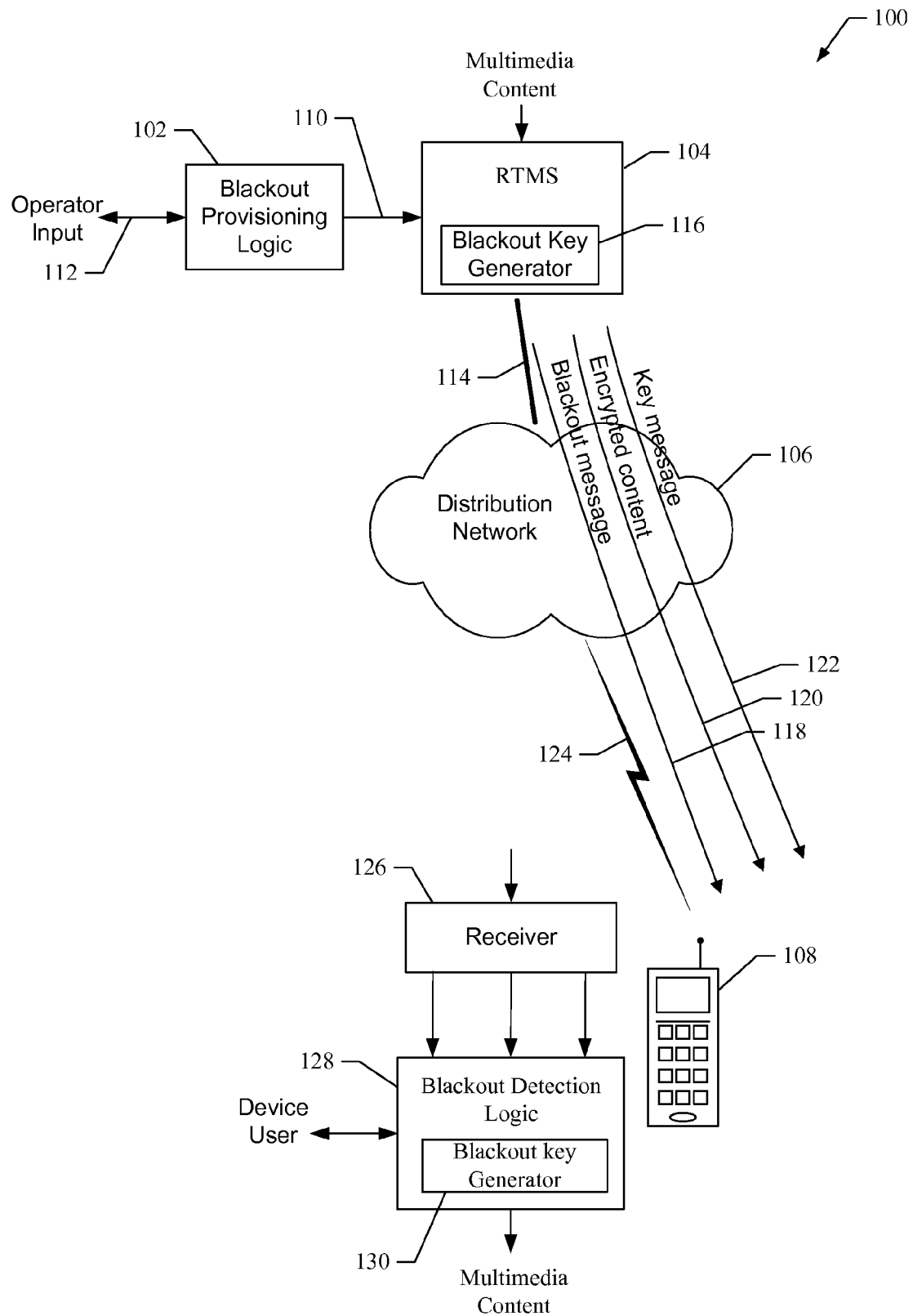
FIG. 1 shows a network that comprises an aspect of a blackout system.

In one or more aspects, a blackout system is provided that operates to provide blackout provisioning and secure content blackout in a distribution system. In an aspect, the blackout system operates to generate a blackout key based on an original working key and parameters in a blackout provisioning message. The blackout parameters describe one or more regions in which selected content is to be blacked out. The blackout key is used to encrypt the content prior to transmission over a network. A blackout message is also generated that identifies the blacked-out content and blackout regions. The blackout message, the encrypted content, and an encrypted version of the original key are then transmitted over a distribution network. A receiving device wishing to decrypt the content processes the blackout message to determine if the device is affected by the blackout. If the device's current region identifier does not match an identifier in the blackout message, then the device is not affected by the black-out. The device may then recover the blackout key using the encrypted original key and the blackout region identifiers in the blackout message. The recovered blackout key is then used to decrypt the content. If the device's current region identifier does match an identifier in the blackout message, then the device is affected by the blackout and the user is notified that the content is not available for viewing. The system provides secure content blackout because if the parameters contained in the blackout message are changed (i.e., during transmission or at a receiving device) so as to override a blackout in a particular area, such an override will be unsuccessful because the original parameters are used to generate the blackout key and the same parameters are needed to recover the same blackout key to decrypt the content.

The system is suited for use in wireless network environments, but may be used in any type of network environment, including but not limited to, communication networks, public networks, such as the Internet, private networks, such as virtual private networks (VPN), local area networks, wide area networks, long haul networks, or any other type of data network.

Overview

In an aspect, the blackout system operates to allow a distribution system operator to black out the delivery of certain multimedia content for a pre-selected period of time in specified coverage areas. This feature prevents users from playing certain content flows ("affected flows") on devices located in the specified areas ("affected areas"). For example, an operator might black out a sporting event due to contractual obligations, such as when a sporting event has not been sold out and cannot be aired in the area where it occurs. In an aspect, the decision to schedule a blackout event is made far enough in advance of the execution of the event to allow manual procedures for scheduling the blackout. In the broadcast industry, the decision to schedule the blackout of a sporting event typically occurs a few days in advance. In another aspect, the blackout system operates to include the transmission of substitute programming to be played over the blacked-out content. This is referred to as blackout and retuning.

FIG. 1 shows a network 100 that comprises an aspect of a blackout system. The network 100 comprises blackout provisioning logic 102, a real time media server (RTMS) 104, a content distribution network 106 and a device 108.

In an aspect, the blackout provisioning logic 102 determines blackout parameters that are provided to the RTMS 104 in a provisioning message 110. For example, the provisioning message 110 identifies multimedia content, areas to be blacked out, blackout start and end times, content used for retuning, and/or any other relevant blackout information.

In an aspect, one or more of the blackout parameters in the provisioning message 110 are provided by content providers and/or other network entities. Additionally, the blackout parameters are determined from operator inputs received through an operator input 112. For example, the blackout parameters specified through operator input 112 comprise, but are not limited to, one or more of the following:
1. Identification of affected content.
2. Identification of one or more affected areas, i.e., specified by zip codes.
3. Start and end times of a blackout event.
4. Substitute programming The blackout system allows the operator to schedule a blackout event within a specified set of Radio Access Network (RAN) coverage areas. These coverage areas are identified in terms of Local Operations Infrastructure (LOI) identifiers associated with the network 106. In an aspect, the LOI's that are affected by a blackout are determined from a list of postal zip codes input by an operator using the operator input 112.

The RTMS 104 operates to receive multimedia content for distribution over the network 106. The RTMS 104 operates to communicate with the network 106 using any type of communication link 114. The network 106 may be any type of wired and/or wireless network. In an aspect, the network 106 provides services to a local area in which the device 108 is operating. For example, the network 106 may operate to distribute multimedia content to a local region or community, city, or county. It should be noted, that although only one device is shown, the system is suitable for use with any number and/or types of devices.

The RTMS 104 comprises blackout key generator 116 that operates to generate a blackout key that is used to encrypt content that is to be blacked out. In an aspect, the blackout key is generated from an original working key (normally used to encrypt content) and local area identifiers (i.e., LOs) that identify regions in which the content is to be blacked out. Thus, the system provides secure content blackout because the blackout key can be recovered only with the original working key and the local area identifiers. If an attempt is made to override a blackout in a particular area (i.e., by changes the area identifiers), such an override will be unsuccessful because the original parameters are needed to recover the same blackout key to decrypt the content.

During the blackout process, the RTMS 104 outputs a blackout message 118 that describes the content that has been blacked out and blackout region identifiers. The RTMS 104 also outputs the encrypted content 120 and an encrypted version of the original working key in a key message 122. This information is transmitted over the network 106 for reception by devices in communication with the network. For example, the RTMS 104 may transmit information over the network in a series of transmission frames. The transmission frame conveys one or more flows, which may comprise content or other information. In an aspect, the blackout message and the key message are conveyed in one of the flows. Additionally, the encrypted content is conveyed in one or more additional flows.

The device 108 communicates with the network 106 using any suitable type of wireless communication link 124. The device 108 receives the blackout message 118, the encrypted content 120, and the key message 122 at a receiver 126. The receiver 126 passes the blackout message 118, the encrypted content 120, and the key message 122 to blackout detection logic 128. The blackout detection logic 128 processes the blackout message 118 to determine content that has been blacked out. For example, when the user of the device 108 attempts to view selected content, the blackout detection logic 128 decodes the blackout message 118 to determine if the device's current region identifier matches a region identifier in the blackout message that is associated with the blacked-out content. If there is a match, then the desired content has been blacked out.

If the desired content has been blacked out, the blackout detection logic 128 operates to notify the user that the content has been blacked-out and is not available for viewing. If the device's current region identifier does not match a region identifier in the blackout message that is associated with the blacked-out content, then the desired content has not been blacked out of the device's current region. The blackout key generator 130 then operates to re-generate the blackout key with which to decrypt the content.

The blackout key generator 130 operates to process the received key message 122 to generate a blackout key with which to decrypt the encrypted content. For example, the original key is decrypted from the key message 122 and is used with the blackout region identifiers in the blackout message 118 to generate the blackout key. Thus, the system provides secure content blackout because the blackout key can be recovered only with the original working key and the local area identifiers. If an attempt is made to override a blackout in a particular area (i.e., by changes the area identifiers), such an override will be unsuccessful because the original parameters are needed to recover the same blackout key to decrypt the content. More detailed descriptions of the operation of the blackout key generators 116 and 130 are provided in other sections of this document. Once the blackout key has been generated by the blackout key generator 130, it is used to decrypt the received content and output it for viewing.

Therefore, aspects of the blackout system operate to provide blackout provisioning and secure content blackout in a distribution network. It should be noted that the network 100 illustrates just one implementation of a blackout system and that other implementations are possible within the scope of the aspects.

Figure 2:
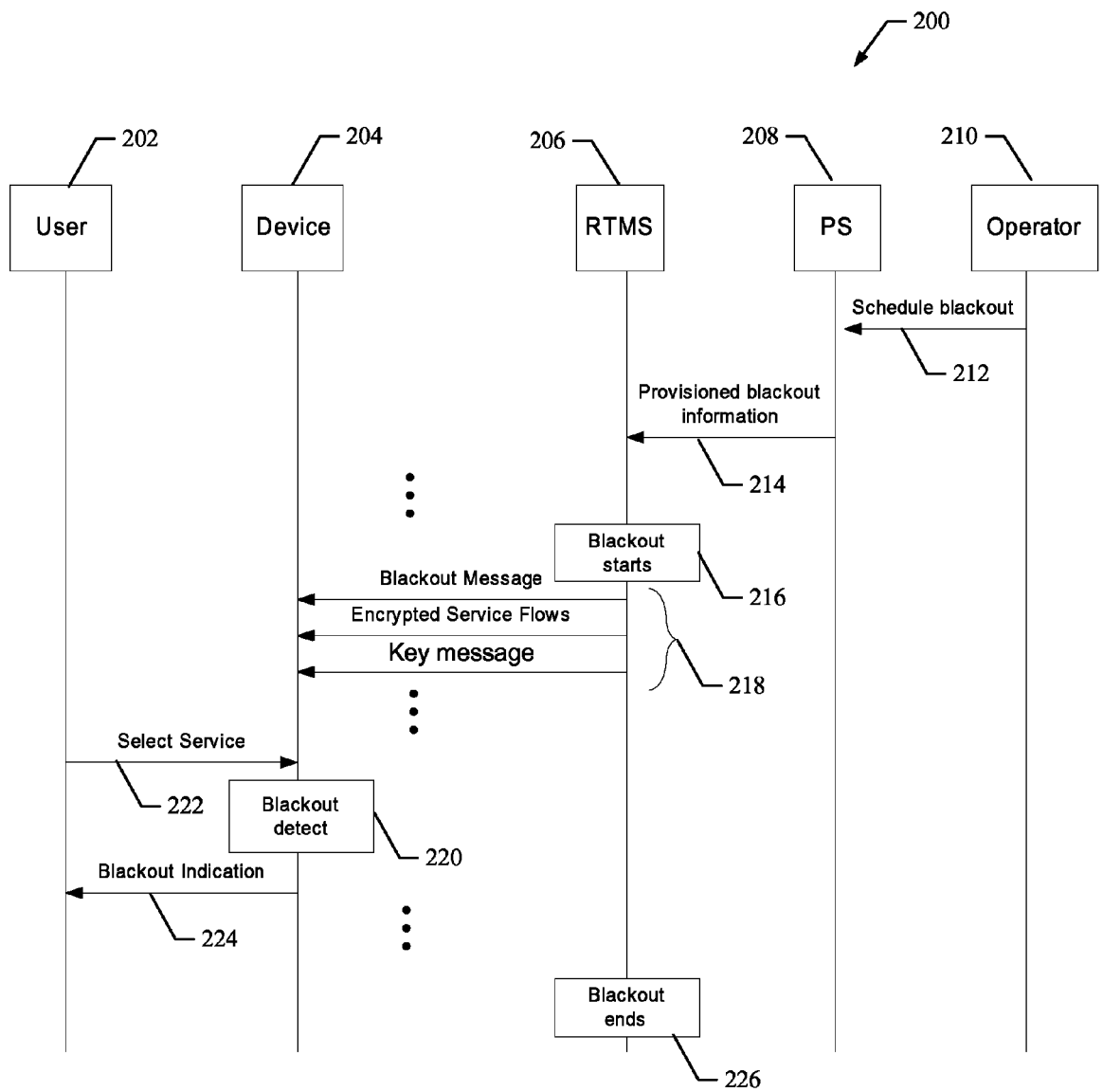
FIG. 2 shows an information flow diagram that illustrates the operation of aspects of a blackout system.

FIG. 2 shows an information flow diagram 200 that illustrates the operation of aspects of a blackout system. For example, the diagram 200 illustrates the flow of information between a RTMS 206 and a device 204.

An operator 210 provides blackout parameters (shown at 212) to provisioning logic 208. The blackout parameters comprise content identifiers, region identifiers, blackout start and end times, and any other relevant information. The provisioning logic 208 operates to assemble the blackout parameters into a provisioning message 214 that is sent to a RTMS 206.

The RTMS 206 operates to perform blackout key generation based on an original working key and the parameters in the blackout message. The blackout key is used to encrypt the content to be blacked out. At the appropriate time, the blackout period begins, as shown at 216, and the RTMS 206 operates to transmit a blackout notification message, encrypted content, and a key message to the device 204, as illustrated at 218.

A user 202 of the device 204 attempts to select a particular service to view, as illustrated at 222. For example, the service may be a multimedia presentation of a sporting event. Blackout detection 220 at the device 204 operates to determine if the selected event is blacked out. For example, the blackout detection 220 operates to determine whether the device's current region identifier matches a region identifier in the blackout message that is associated with the selected content. If a match occurs, the presentation is blacked-out from the device 204.

If the presentation is blacked out, a blackout indicator 224 is presented to the device user 202. If a match does not occur so that the presentation is not blacked out, the presentation is decoded using a blackout key generated from the original key provided in the key message and blackout regions provided in the blackout message. The decrypted content is then presented to the device user. At some time later, the blackout period ends 226 and the RTMS 206 operates to end the transmission of the encrypted content.

Figure 3:
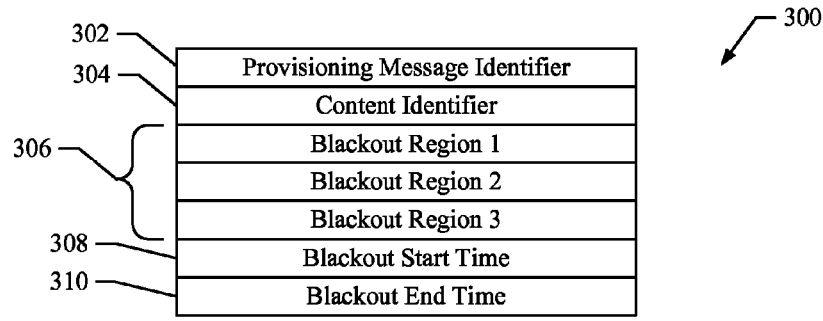
FIG. 3 shows a provisioning message for use in aspects of a blackout system.

FIG. 3 shows a provisioning message 300 for use in aspects of a blackout system. For example, the provisioning message 300 may be the provisioning message 110 shown in FIG. 1. In an aspect, the blackout provisioning logic 102 shown in FIG. 1 operates to generate the provisioning message 300.

In an aspect, a decision to blackout an event is made in advance of the blackout execution time. In this case, an operator will perform a manual procedure to schedule each blackout event. The operator enters the following information; however, the list is not exhaustive.
1. Affected service
2. Affected areas in terms of zip codes
3. Blackout execution start time
4. Blackout execution end time With regards to selected content, a content provider may specify the areas that are affected by the blackout as a list of valid zip codes. The operator may manually input the zip codes into the blackout provisioning logic 102. As part of the provisioning process, the blackout provisioning logic 102 maintains mapping information between zip codes and LOI identifiers. If one or more zip codes belonging to a LOI are configured as affected areas, the entire LOI will be affected by the blackout event.

In an aspect, the operator input 112 of the blackout provisioning logic 102 allows an operator to perform the following functions.
1. Allow the operator to modify a scheduled blackout event (start time, end time and zip codes) at any time up until the scheduled start time of the event.
2. Allow the operator to modify only the end time of a blackout event after the scheduled start time of the event. (The length of the event can be shortened or lengthened.)
3. Allow the operator to cancel a scheduled blackout event before the start time of the event.

With the possible exception of the service identifier, an operator will be able to modify any blackout event parameter before the start time of the event. If an operator wishes to change the service identifier, the operator may cancel the blackout schedule for the previous service identifier and create a schedule for the new service identifier.

After the operator schedules the blackout event, the blackout provisioning logic 102 sends the blackout provisioning message 110 to the RTMS 104. Whenever a blackout event is modified or cancelled, the blackout provisioning logic 102 provides the RTMS 104 with the modified or cancelled blackout event information.

If a new blackout event is configured at the blackout provisioning logic 102 after a previous blackout event was configured and before the end time of the previous blackout event, the blackout provisioning logic 102 sends not only the new blackout event information but also the previous blackout event information. That is, whenever a new blackout event is scheduled for a given service, the blackout provisioning logic 102 sends the whole list of blackout events that will be executed in the future or are currently executing.

For example, in the case of a cancellation, if there is any future scheduled blackout event, the blackout provisioning logic 102 sends the blackout provisioning message without including any blackout information. The RTMS 104 overwrites the locally stored set of blackout information with the blackout information in the new blackout provisioning message. The RTMS 104 will trigger further processing at execution time.

If a blackout event is configured, the blackout provisioning logic 102 provides the RTMS 104 with the blackout event parameters, the affected service identifier, the affected list of LOI identifiers, and the start and end time of the blackout period. The RTMS 104 overwrites the locally stored set of blackout information with the blackout information in the blackout provisioning message.

The provisioning message 300 comprises a message identifier 302 having any suitable format and/or configuration that operates to identify the provisioning message. The provisioning message 300 also comprises at least one service (or content) identifier 304 that identifies content to be blacked out. For example, the service identifier 304 may identify a presentation such as a sporting event or other presentation event that is subject to blackout.

The provisioning message 300 also comprises blackout region identifiers 306 that identify regions in which the identified content is to be blacked out. For example, the region identifiers may comprise selected postal zip codes, network LOI's, or any other type of region identifiers.

The provisioning message 300 also comprises a blackout start time 308 and a blackout end time 310. The blackout start 308 and end 310 times indicate the duration of a blackout time period during which the identified content will be blacked out from selected regions. It should also be noted that the provisioning message 300 may comprises any other parameters to facilitate the operation of the blackout system.

Figure 4:
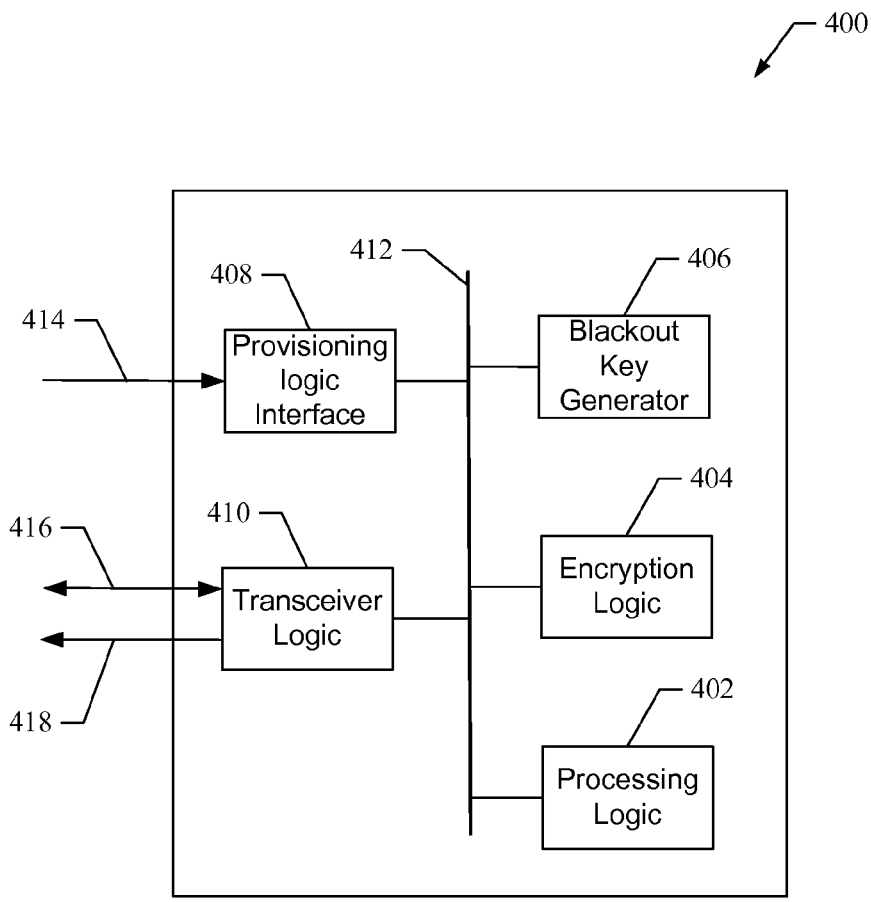
FIG. 4 shows a real time media server for use in aspects of a blackout system.

FIG. 4 shows a RTMS 400 for use in aspects of a blackout system. For example, the RTMS 400 is suitable for use as the RTMS 104 shown in FIG. 1. In an aspect, the RTMS 400 comprises processing logic 402, encryption logic 404, blackout key generator 406, provisioning logic interface 408, and transceiver logic 410 all coupled to a data bus 412.

The transceiver logic 410 comprises hardware and/or software that operate to allow the RTMS 400 to communicate data or other information over a network with remote devices or systems. For example, in an aspect, the transceiver logic 410 comprises broadcast logic that operates to broadcast encrypted content and other information over a broadcast channel 418. The term "broadcast" is used herein to mean a broadcast, multicast or other transmission over a network that can be received by two or more devices. In an aspect, the transceiver logic 410 also comprises unicast logic to communicate over a unicast channel 416 so that the RTMS 400 may communicate directly over a network with a particular device.

The provisioning logic interface 408 comprises hardware and/or software that operate to allow the RTMS 400 to communicate with provisioning logic to receive a provisioning message that identifies content to be blacked out in selected regions. For example, the provisioning logic interface 408 comprises communication logic that allows communication with provisioning logic over a wired or wireless network communication link or any other suitable link, such as the communication link 414. In an aspect, the provisioning logic interface 408 operates to receive a provisioning message formatted as shown in FIG. 3.

The blackout key logic 406 comprises at least one of a CPU, processor, gate array, hardware logic, memory elements, virtual machine, software, and/or any combination of hardware and software. The blackout key logic 406 operates to determine blackout keys that are used to encrypt content that is to be blacked out in selected regions. In an aspect, the blackout key logic 406 operates to combine an original working encryption key with region identifiers (i.e., LOI's) to produce a blackout working key. A more detailed description of the generation of blackout working keys is provided in another section of this document.

The encryption logic 404 comprises a CPU, processor, gate array, hardware logic, memory elements, virtual machine, software, and/or any combination of hardware and software. The encryption logic 404 operates to encrypt content using blackout working keys generated by the blackout key generator 406. In an aspect, the encryption logic 404 also operates to encrypt an original working key using a service key to produce an encrypted version of the original key.

In one or more aspects, the processing logic 402 comprises a CPU, processor, gate array, hardware logic, memory elements, virtual machine, software, and/or any combination of hardware and software. Thus, the processing logic 402 generally comprises logic to execute machine-readable instructions and to control one or more other functional elements of the RTMS 400 using the data bus 412.

In an aspect, the processing logic 402 operates to generate transmission frames comprising encrypted content for distribution to devices on a network. For example, the transmission frames are broadcast over the broadcast channel 418 by the transceiver logic 410. In an aspect, the transmission frames convey streams comprising content flows of encrypted content. In an aspect, the streams also comprise a key message used to convey an encrypted original key and a blackout message. The blackout message identifies content that has been blacked out in selected regions.

Therefore, aspects of the blackout system at the RTMS 400 operate to perform one or more of the following functions.
1. Receive a provisioning message comprising blackout parameters that describe content to be blackout, blackout regions (LOI's), and start and end times.
2. Generate blackout keys from original working keys and the LOI's in the provisioning message.
3. Encrypt content with the blackout keys.
4. At the blackout start time, transmit a blackout message, the encrypted content, and an encrypted version of an original working key.
5. Terminate the transmission of encrypted content at the blackout end time.

In an aspect, the blackout system comprises one or more program instructions ("instructions") or sets of codes ("codes") stored on a machine-readable medium, which when executed by at least one processor, for instance, a processor at the processing logic 402, provides the functions described herein. For example, the codes may be loaded into the processing logic 402 from a machine-readable medium, such as a floppy disk, CDROM, memory card, FLASH memory device, RAM, ROM, or any other type of memory device or machine-readable medium that interfaces to the processing logic 402. In another aspect, the codes may be downloaded into the processing logic 402 from an external device or network resource. The codes, when executed, provide aspects of a blackout system as described herein.

Therefore, the blackout system operates to provide blackout provisioning and encryption of content to be blacked-out in a distribution network. It should be noted that the RTMS 400 is just one implementation and that other implementations are possible within the scope of the aspects.

Figure 5:
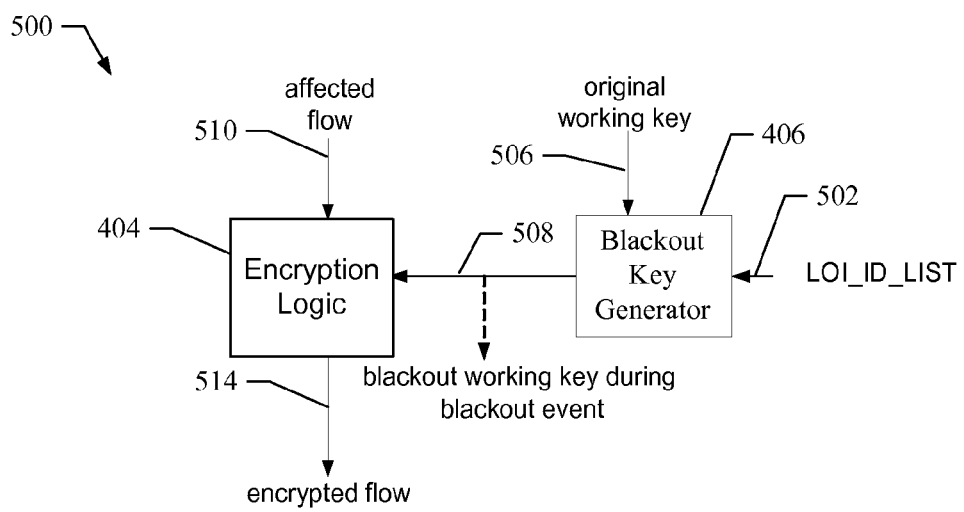
FIG. 5 shows a functional diagram that illustrates the operation of aspects of a blackout system.

FIG. 5 shows a functional diagram 500 that illustrates the operation of aspects of a blackout system. For example, the diagram 500 illustrates the operation of the RTMS 400 shown in FIG. 4. In an aspect, blackout working key generator 406 operates to receive a LOI list 502 and an original working key 506 to produce a blackout working key 508. The LOI list may be provided to the RTMS 400 in a provisioning message received by the provisioning logic interface 414. The blackout working key 508 is input to encryption logic 404 that also receives an affected flow 510. The encryption logic 404 encrypts the affected flow 510 with the blackout working key 508 to produce an encrypted flow 514 for transmission over a network.

Figure 6:
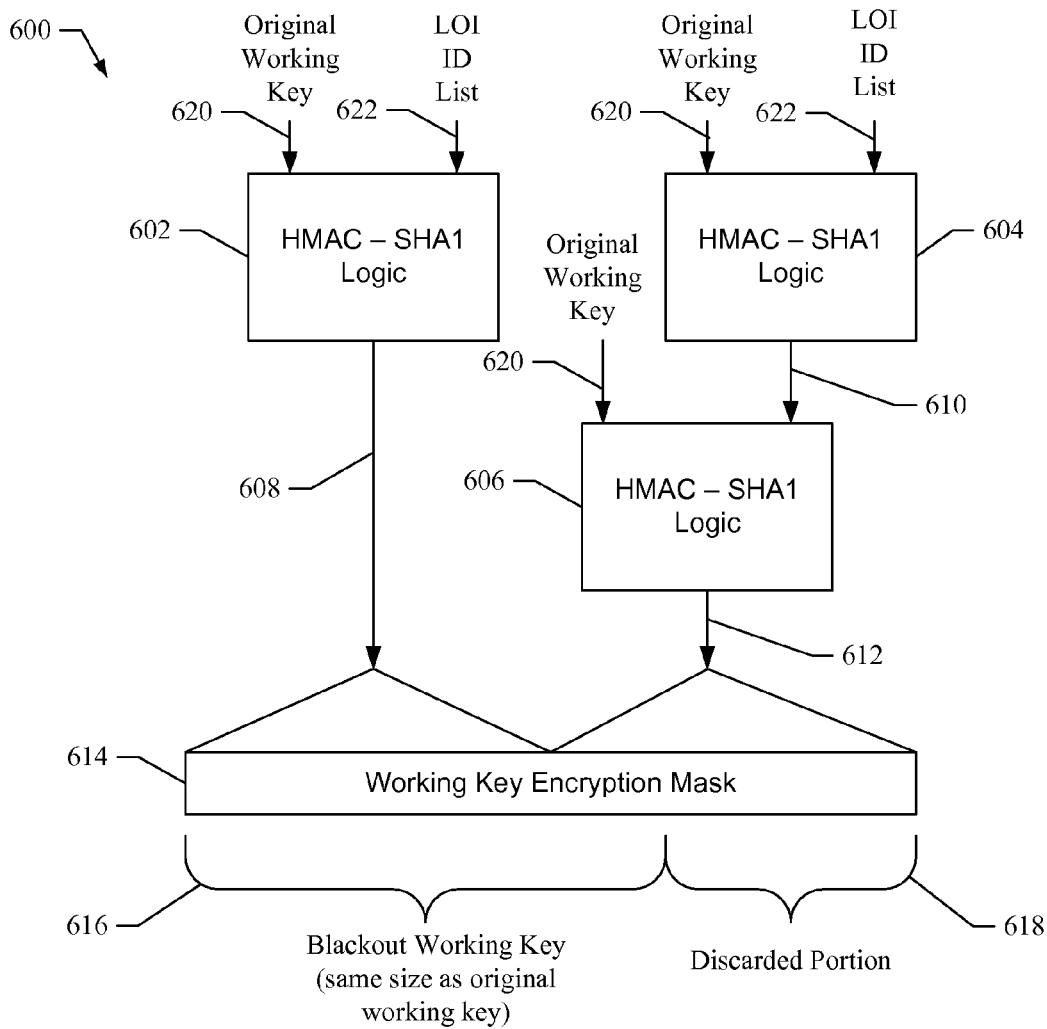
FIG. 6 shows a diagram of a blackout key generator for use in aspects of a blackout system.

FIG. 6 shows a diagram of a blackout key generator 600 for use in aspects of a blackout system. For example, the blackout key generator 600 is suitable for use as the blackout key generators 116 and 130 shown in FIG. 1. The blackout key generator 600 is also suitable as the blackout key generator 406 shown in FIG. 4.

During operation, instead of using an original working key obtained from a Digital Rights Management Server (DRMS), the RTMS 400 derives a blackout working key to encrypt the flows of the affected service. The blackout key is obtained by applying a one-way message authentication code (MAC) algorithm to the original working key and the list of LOI identifiers corresponding to the areas to be affected by the blackout. In an aspect, the original working key 620 and the LOI identifier list 622 are input to HMAC-SHA1 logic 602 and 604. The HMAC-SHA1 logic 602 and 604 operate to produce a keyed-hash message authentication code (HMAC) (shown at 608 and 610, respectively) that is a type of message authentication code calculated using a cryptographic hash function in combination with the original working key. One type of cryptographic hash function is referred to as SHA-1, which is a secure hash algorithm that is part of a group of cryptographic hash functions developed by a national security organization. The output of the HMAC-SHA-1 logic 602 and 604 are twenty-byte values, shown at 608 and 610, respectively.

Additionally, the original working key 620 and the output 610 are input to HMAC-SHA1 logic 606 to produce output 612. The outputs 608 and 612 are combined to form a working key encryption mask 614. The blackout working key 616 is determined from the working key encryption mask 614 and its size is the same size as the original working key 620. Another portion (618) of the working key encryption mask 614 is discarded. The determined blackout working key 616 is used to encrypt the stream data for the blacked-out flows. It should be noted that the blackout key generator 600 may use any suitable type of MAC algorithm or any other suitable type of encryption algorithm to derive the blackout key.

Therefore, if a flow is affected by a blackout event, the RTMS 400 operates to generate a working key encryption mask by feeding an original working key and the list of blackout affected LOI identifiers to the blackout key generator 406. In an aspect, the blackout key generator 406 operates to perform one or more of the following functions.

1. Use a LOI identifier list in the same byte order as it is presented in an associated blackout message while hashing it with the original working key.
2. Generate the blackout working key by extracting the same number of bytes as the original working key from the most significant bytes of the working key encryption mask.

Figure 7:
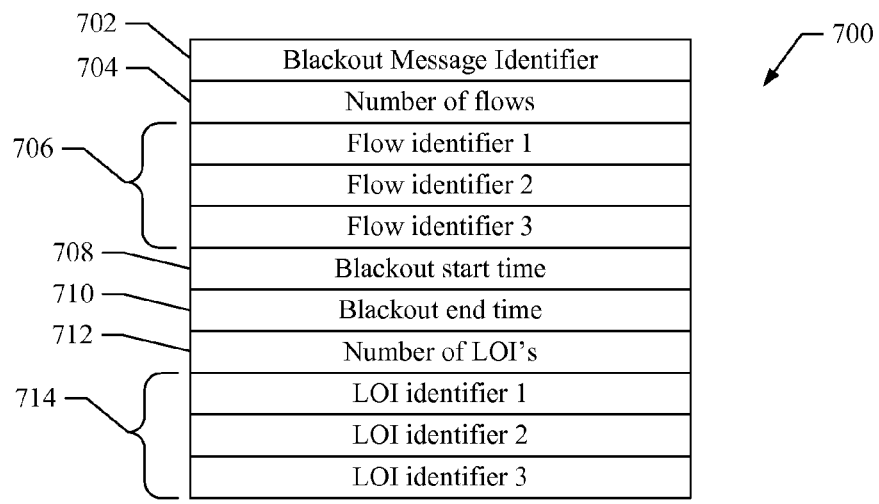
FIG. 7 shows a blackout message for use in aspects of a blackout system.

FIG. 7 shows a blackout message 700 for use in aspects of a blackout system. For example, the blackout message 700 is suitable for use as the blackout message 118 shown in FIG. 1.

The blackout message 700 comprises a message identifier field 702 that specifies that the message 700 is a blackout message. In an aspect, the RTMS 400 set the message identifier field to a value of six (6) to indicate blackout.

The blackout message 700 comprises a "number of flows" field 704 that comprises a value that represents the number of flows of the service to be blacked out. In an aspect, the RTMS 400 sets the "number of flows" field 704 to a value that is equal to the total number of flows of the service to be blacked out.

The blackout message 700 comprises a flow identifier field 706 that represents the identity of the flows being blacked out during an event. In an aspect, the RTMS 400 includes a number of instances of the flow identifier field 706 that is represented by the value provided in the "number of flows" fields 704.

The blackout message 700 comprises a blackout start time field 708 that represents the start time of the blackout. In an aspect, the RTMS 400 sets the blackout start time field 708 to the start time of the blackout event.

The blackout message 700 comprises a blackout end time field 710 that represents the end time of the blackout. In an aspect, the RTMS 400 sets the blackout end time field 710 to the end time of the blackout event.

The blackout message 700 comprises a "number of LOI identifiers" field 712 represents the number of LOI's affected by the blackout event. In an aspect the RTMS 400 sets the "number of LOI identifier" field 712 in the blackout message to a value equal to the total number of LOI's being blacked out.

The blackout message 700 comprises a LOI identifier field 714 that represents the identity of the LOI's affected by the blackout event. In an aspect, the RTMS 400 includes a number of instances of the LOI identifier field 714 that is represented by the value provided in the "number of LOI identifier" field 712.

Figure 8:
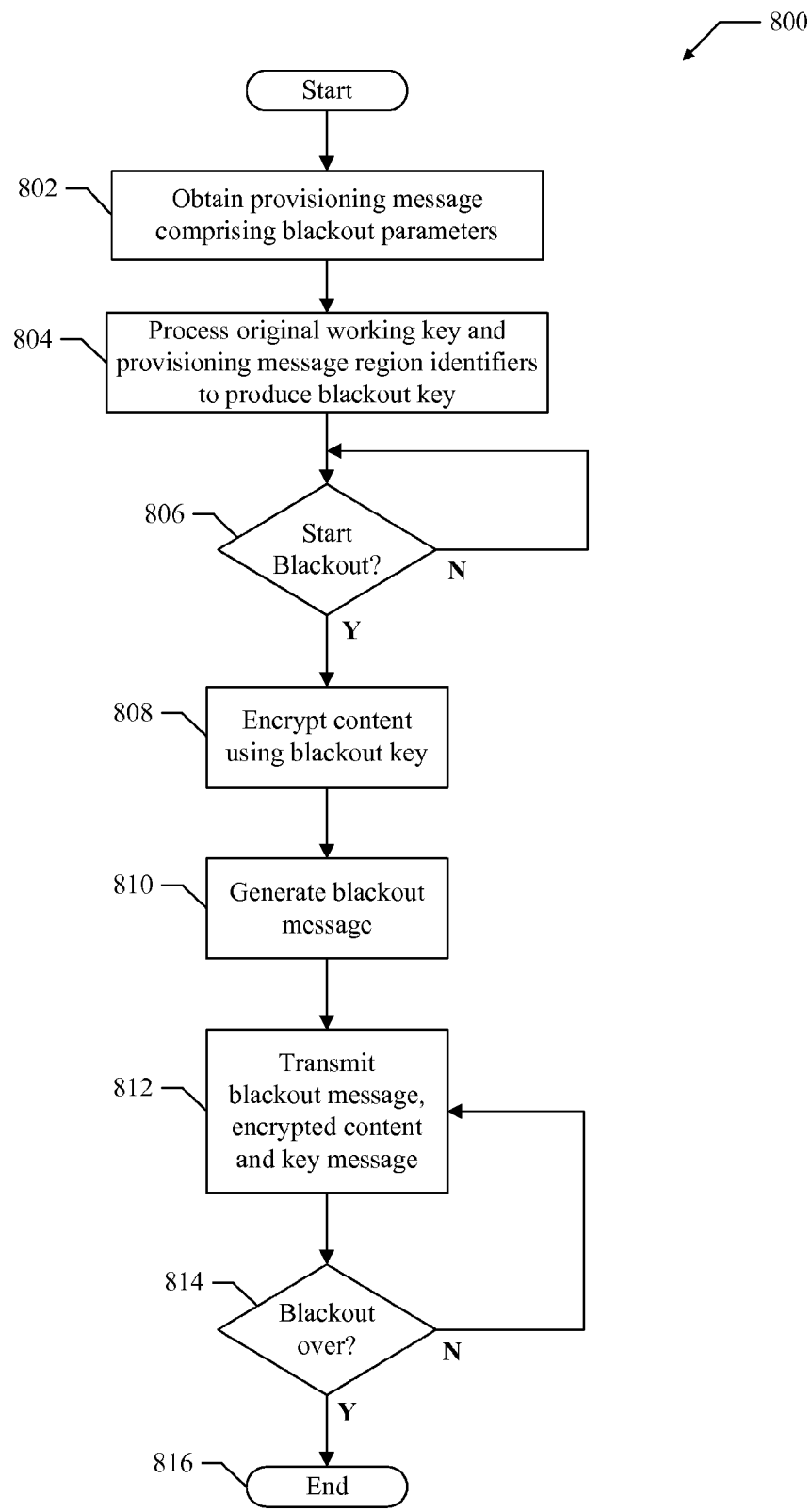
FIG. 8 shows a method for operating a server for use in aspects of a blackout system.

FIG. 8 shows a method 800 for operating a server for use in aspects of a blackout system. For clarity, the method 800 is described herein with reference to the RTMS 400 that is shown in FIG. 4. For example, in an aspect, the processing logic 402 executes one or more sets of codes to control the RTMS 400 to perform the functions described below.

At block 802, obtain blackout provisioning message comprising blackout parameters. For example, the blackout parameters are obtained from a blackout provisioning message transmitted from the blackout provisioning logic 102. In an aspect, the provisioning logic interface 408 operates to receive the blackout provisioning message from the blackout provisioning logic 102. For example, the provisioning message may be formatted as the provisioning message 300 shown in FIG. 3.

At block 804, the blackout provisioning message is processed to produce a working blackout key. For example, an original working key and parameters from the blackout provisioning message such as region identifies (i.e., LOI list) are used to generate the blackout key. In an aspect, the blackout key generator 406 processes an original working key and the LOI list to produce the working blackout key.

At block 806, a determination is made as to whether a blackout time interval has begun. For example, blackout start time parameters in the received blackout provisioning message are processed to determine if a blackout interval has begun. In an aspect, the processing logic 402 operates to process the received blackout provisioning message to determine if a blackout interval has begun. If it is determined that a blackout interval has not begun, the method remains at block 806. If it is determined that a blackout interval has begun, the method proceeds to block 808.

At block 808, content is encrypted using the blackout working key. In an aspect, the encryption logic 404 operates to encrypt content identified in the blackout provisioning message using the blackout working key. For example, the content is received by the transceiver logic 410 from one or more content providers. In addition, the original working key is encrypted using a service key to produce an encrypted version of the original working key.

At block 810, a blackout message is generated. In an aspect the processing logic 402 generates the blackout message to describe the content is that is to be blacked out during the blackout interval and blackout regions. For example, the blackout message is formatted as shown in FIG. 7.

At block 812, the blackout message, encrypted content and the encrypted version of the original working key are transmitted over a network. For example, the blackout message 118, encrypted content 120, and key message 122 are transmitted in one or more streams conveyed by a sequence of transmission frames.

At block 814, a determination is made as to whether the blackout period has expired. For example, blackout end time parameters in the received blackout provisioning message are processed to determine if a blackout interval has expired. In an aspect, the processing logic 402 operates to process the received blackout provisioning message to determine if a blackout interval has expired. If it is determined that a blackout interval has not expired, the method returns to block 812. If it is determined that a blackout interval has expired, the method proceeds to block 816.

Thus, the method 800 operates to provide an aspect of a blackout system. It should be noted that the method 800 represents just one implementation and that other implementations are possible within the scope of the aspects.

Figure 9:
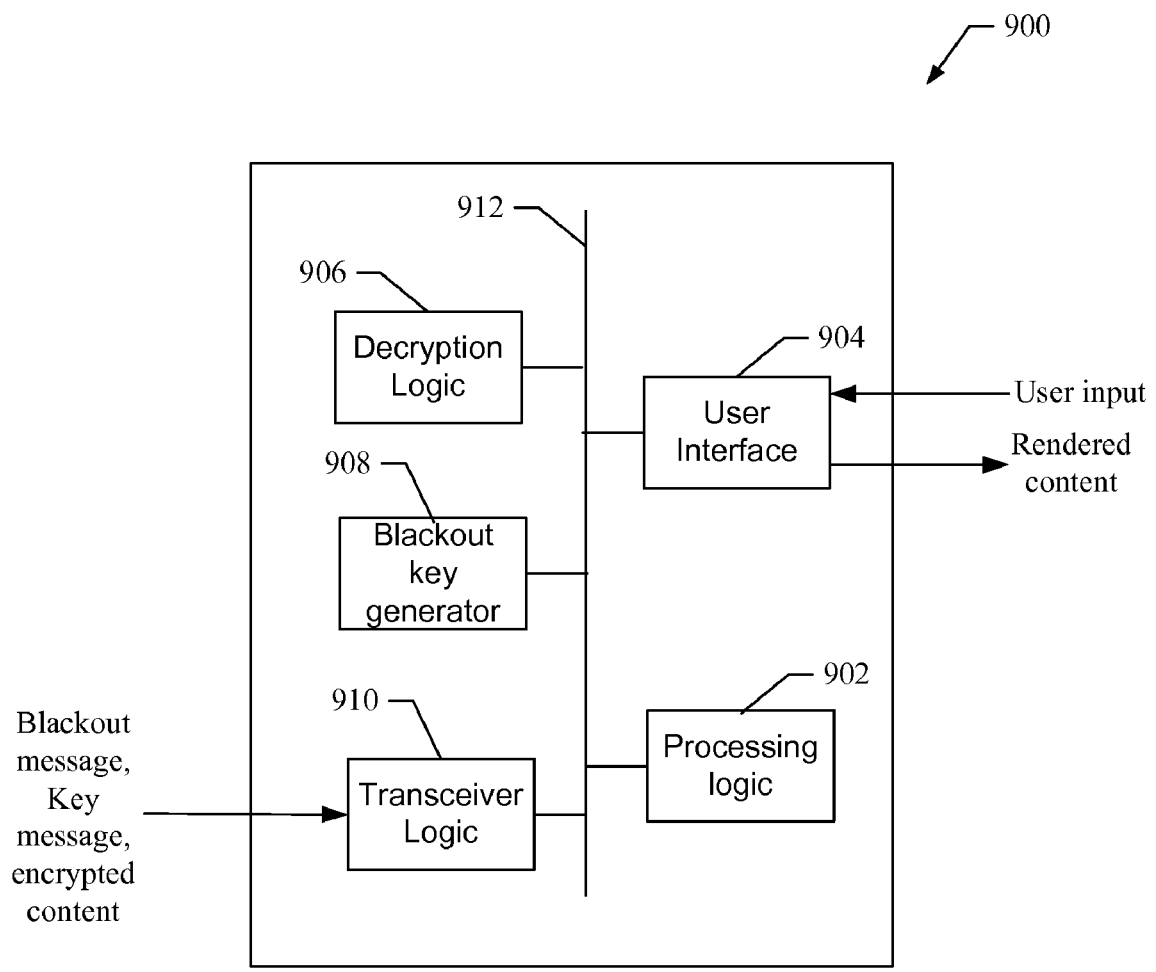
FIG. 9 shows blackout detection logic for use in aspects of a blackout system.

FIG. 9 shows blackout detection logic 900 for use in aspects of a blackout system. For example, the blackout detection logic 900 is suitable for use as the blackout detection logic 128 shown in FIG. 1. The blackout detection logic 900 comprises processing logic 902, user interface 904, detection logic 906, blackout key generator 908, and transceiver logic 910 all coupled to a data bus 912.

In an aspect, the processing logic 902 comprises at least one of a CPU, processor, gate array, hardware logic, memory elements, virtual machine, software, and/or any combination of hardware and software. Thus, the processing logic 902 generally comprises logic configured to execute machine-readable instructions and to control one or more other functional elements of the blackout detection logic 900 using the data bus 912.

The transceiver logic 910 comprises hardware and/or software that operate to allow the blackout detection logic 900 to receive broadcasted encrypted content and other information. For example, the transceiver logic 910 is configured to receive a blackout message, key message, and encrypted content.

The user interface 904 comprises any combination of hardware and/or software configured to allow the blackout detection logic 900 to communicate with one or more users. For example, the user interface 904 comprises rendering logic configured to render content on any type of display device. The user interface 904 also comprises input logic configured to receive any type of user input. For example, the input logic operates to allow a user to input information from a keyboard, keypad, or other type of input device.

The blackout key generator 908 comprises at least one of a CPU, processor, gate array, hardware logic, memory elements, virtual machine, software, and/or any combination of hardware and software. The blackout key generator 908 operates to process an original working key provided in a key message and region identifiers provided in a blackout message to produce a blackout working key that can be used to decrypt an encrypted flow. In an aspect, the blackout key generator 908 is configured as the blackout key generator 600 shown in FIG. 6.

The decryption logic 906 comprises any suitable hardware and/or software and operates to decrypt received content using a blackout key provided by the blackout key generator 908. The decryption logic 906 also operates to decrypt a received key message using a service key to determine an original working key that is processed by the blackout key generator 908.

During the blackout event, regardless of geographic regions, the flows associated with the affected service will be encrypted with a blackout working key. A device will receive an encrypted working key (i.e., key message 122 shown in FIG. 1) that is associated with the flow. If a selected blackout active field in the key message is set to 1, a blackout event is active for the flow.

If the device receives a blackout message, a blackout event is active for the flow. If the blackout event is active, the device will determine if it is affected by the blackout event or not by comparing its current LOI identifier with the list of LOI identifiers in the blackout message. The current LOI identifier of the device is the LOI identifier most recently received on a local Overhead Information Symbols (OIS) channel.

If the current LOI identifier of the device does not match at least one LOI identifier from the list of LOI identifiers in the blackout message, then the device is not affected by the blackout event. The device will be able to decrypt the content from the service flows using a blackout working key generated at the device from the original key received in the key message and region identifiers provided in the blackout message.

Blackout Key Generation

In an aspect, the blackout detection logic 900 performs the following functions to generate a blackout working key that can be used to decrypt received content.
1. Recover the original working key from the encrypted version of the original working key provided in a key message using a service key.
2. Apply the same blackout key generation procedure used at a RTMS to generate a working key encryption mask from the original working key and the list of LOI identifiers provided in a received blackout message.
3. Use the same number of bytes as the original working key from the most significant bytes of the working key encryption mask to produce a blackout key.

If a blackout event is active and the current device LOI identifier does not match any of LOI identifiers in the blackout message, the device shall generate a working key encryption mask by feeding the working key and the list of blackout affected LOI identifiers to the blackout key generator 908. The blackout key generator 908 uses the LOI identifier list in the same byte order as it is presented in the blackout message while hashing it with the original working key.

Blackout Indications

Indications of the blackout event are presented to users if they select an affected service in an affected area. The blackout indications operate to let the device user know that the blackout event is currently in progress. If the current LOI identifier of the device matches one of the LOI identifiers listed in the blackout message, a blackout indication will be issued.

In an aspect, the blackout indications may contain any or all of the following information.
1. Start time of the blackout event
2. End time of the blackout event
3. List of LOI IDs representing the areas where the blackout event is in effect In an aspect, a device user will receive blackout indications in any or all of the following scenarios.
1. A user selects an affected service from a device program guide while located in an affected LOI area during a blackout event.
2. A user is playing an affected service in an affected LOI area at the start of a blackout event.
3. A user moves into an affected LOI area while playing an affected service during a blackout event.
4. If a blackout event is active for a flow and the current device LOI identifier matches any of the LOI identifiers in the blackout message, the device shall notify the user of the blackout indication by displaying the blackout event information.
5. If a blackout event is active for a flow and the device's LOI identifier is not present in the device, the device shall notify the user of the blackout indication by displaying the blackout event information.

Figure 10:
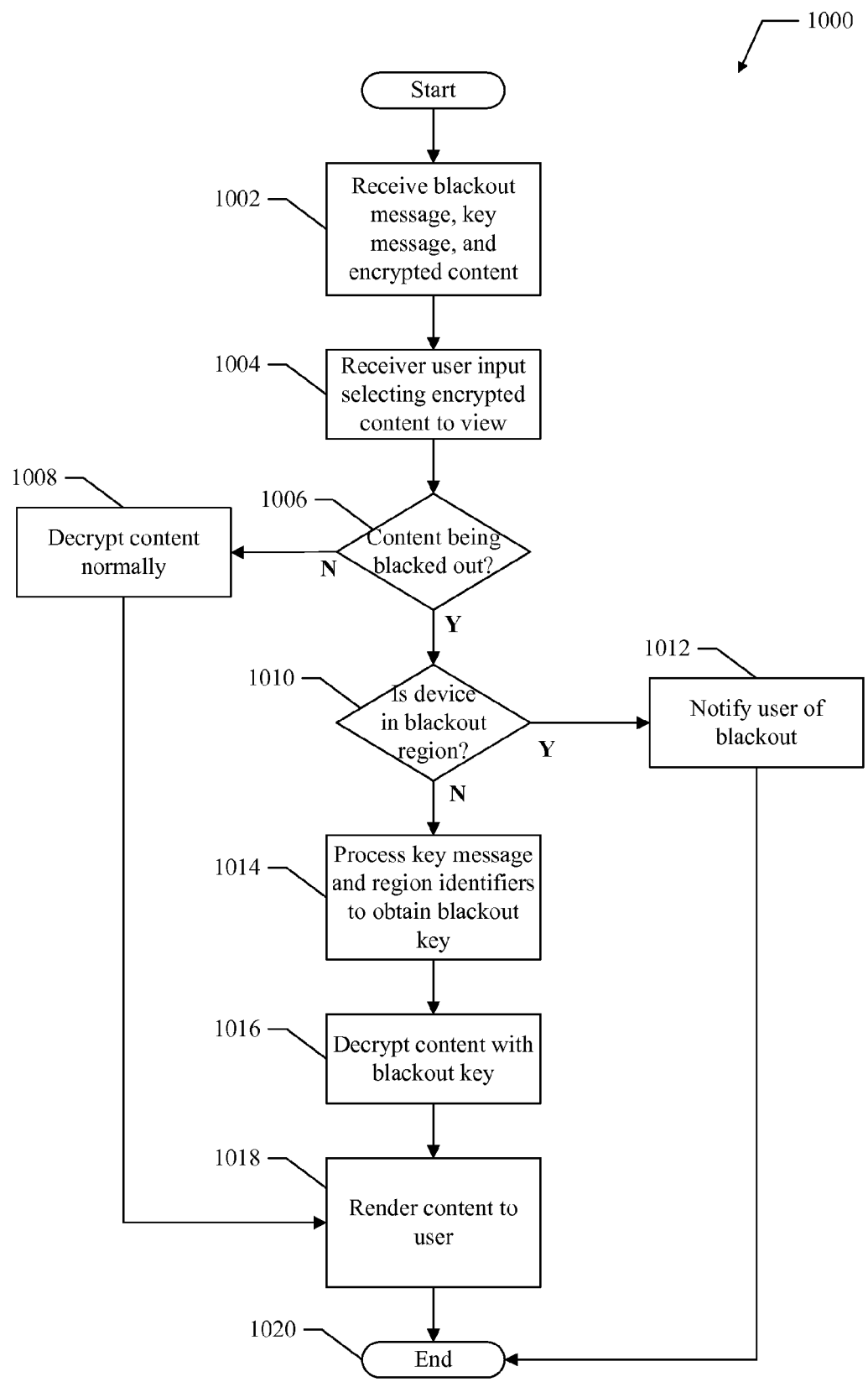
FIG. 10 shows a method operating a device for use in aspects of a blackout system.

FIG. 10 shows a method 1000 operating a device for use in aspects of a blackout system. For clarity, the method 1000 is described herein with reference to a device comprising the blackout detection 900 shown in FIG. 9. For example, in an aspect, the processing logic 902 executes one or more sets of codes to control the blackout detection logic 900 to perform the functions described below.

At block 1002, a blackout message, key message, and encrypted content are received at a device. In an aspect, the blackout message, key message, and encrypted content are received by the transceiver logic 910.

At block 1004, user input is received that selects content for viewing. In an aspect, the user input is received by the user interface 904.

At block 1006, a determination is made as to whether the selected content is being blacked out. In an aspect, the processing logic 902 processes a received blackout message to determine if the selected content is being blacked out. If the content is being blacked out, the method proceeds to block 1010. If the content is not being blacked out, the method proceeds to block 1008.

At block 1008, because the selected content is not being blacked out, decryption of the selected content is performed as normal. Decryption keys at the device are used by the decryption logic 906 to decrypt the content. The method then proceeds to block 1018.

At block 1010, a determination is made as to whether the device is in a region in which the selected content is being blacked-out. In an aspect, the region identifiers in the received blackout message are check against the device's current location. In an aspect, the processing logic 902 performs this check to determine if the device is currently located in a blackout region identified in the blackout message. If the device is located in a blackout region, the method proceeds to block 1012. If the device is not located in a blackout region, the method proceeds to block 1014.

At block 1012, the user is notified that the selected content is blacked out. In an aspect, the processing logic 902 operates to send notification to the device user through the user interface 904. The method then ends at block 1020.

At block 1014, the key message and region identifiers in the blackout message are processed to produce a blackout key. In an aspect, the blackout key generator 908 operates to process an original key decrypted from a key message and region identifiers provided in a blackout message to produce a blackout key. In an aspect, the key generator 908 operates according to the key generator 600 shown in FIG. 6 to produce the blackout key.

At block 1016, the received encrypted content is decrypted using the blackout key determined at block 1014. In an aspect, the decryption logic 906 operates to decrypt the selected content using the blackout key produced at block 1014.

At block 1018, the decrypted content is rendered by the device for viewing by the device user. In an aspect, the user interface 904 operates to render the selected content on the device.

Thus, the method 1000 operates to provide an aspect of a blackout system. It should be noted that the method 1000 represents just one implementation and that other implementations are possible within the scope of the aspects.

Figures 11, 12:
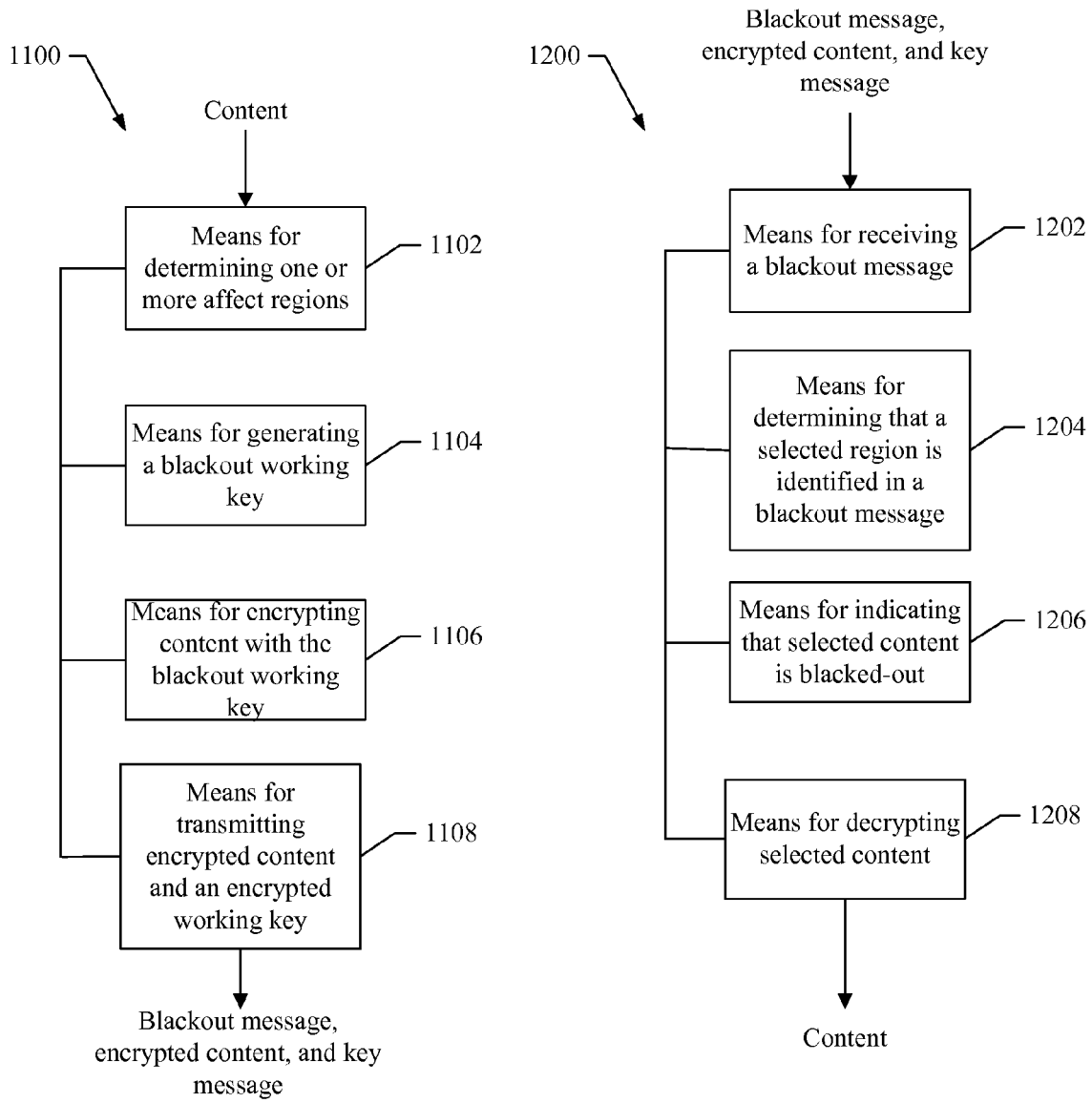
FIG. 11 shows an example of real time media server for use in aspects of a blackout system.
FIG. 12 shows an example of blackout detection logic for use in aspects of a blackout system.

FIG. 11 shows a RTMS 1100 for use in aspects of a blackout system. For example, the RTMS 1100 is suitable for use as the RTMS 400 shown in FIG. 4. In an aspect, the RTMS 1100 is implemented by at least one processor comprising one or more modules configured to provide aspects of a blackout system as described herein. For example, each module comprises hardware, software, and/or any combination thereof The RTMS 1100 comprises a first module comprising means (1102) for determining one or more affected regions, which in an aspect comprises the provisioning logic 408. The RTMS 1100 also comprises a second module comprising means (1104) for generating a blackout key based an original key and the one or more affected regions, which in an aspect comprises the blackout key generator 406. The RTMS 1100 also comprises a third module comprising means (1106) for encrypting content with the blackout key to produce encrypted content, which in an aspect comprises the encryption logic 404. The RTMS 1100 also comprises a fourth module comprising means (1108) for transmitting the encrypted content and an encrypted version of the original key over the distribution network, which in an aspect comprises the transceiver logic 410.

FIG. 12 shows blackout detection logic 1200 for use in aspects of a blackout system. For example, the blackout detection logic 1200 is suitable for use as the blackout detection logic 900 shown in FIG. 9. In an aspect, the blackout detection logic 1200 is implemented by at least one processor comprising one or more modules configured to provide aspects of a blackout system as described herein. For example, each module comprises hardware, software, and/or any combination thereof.

The blackout detection logic 1200 comprises a first module comprising means (1202) for receiving a blackout message indicating that selected content has been blacked-out, which in an aspect is provided by the transceiver 910. The blackout detection logic 1200 also comprises a second module comprising means (1204) for determining if a selected region is identified in the blackout message, which in an aspect is provided by the processing logic 902. The blackout detection logic 1200 also comprises a third module comprising means (1206) for indicating that the selected content is blacked out if the selected region is identified in the blackout message, which in an aspect comprises user interface 904. The blackout detection logic 1200 also comprises a fourth module comprising means (1208) for decrypting the selected content if the selected region is not identified in the blackout message, which in an aspect comprises the decryption logic 906.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed aspects is provided to enable any person skilled in the art to make or use the present invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while aspects of a blackout system have been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

What is claimed is:

1. A computer-implemented method for blackout provisioning in a distribution network, the method comprising:
   determining one or more affected regions of a blackout including a blackout interval;
   generating a blackout key based on an original key and the one or more affected regions, wherein the original key is a digital rights management (DRM) key;

encrypting content with the blackout key to produce encrypted content;

transmitting, during the blackout interval, the encrypted content and an encrypted version of the original DRM key over the distribution network, wherein said generating the blackout key comprises:

processing DRM key and a list of the one or more affected regions with a message authentication code MAC algorithm to produce a working key encryption mask; and determining the blackout key from a selected portion of the working key encryption mask.

2. The method of claim 1, further comprising transmitting a blackout message that associates the one or more affected regions with the encrypted content, the blackout message including a blackout start time and a blackout end time of the blackout interval.

3. The method of claim 1, wherein said transmitting comprises transmitting a key message that comprises the encrypted version of the original DRM key.

4. The method of claim 1, wherein said determining comprises determining the one or more affected regions from a provisioning message.

5. The method of claim 1, wherein said determining comprises determining the one or more affected regions based on a list of local operation infrastructures (LOIs).

6. The method of claim 1, wherein said transmitting comprises transmitting the encrypted content and an encrypted version of the original DRM key during a selected blackout interval.

7. An apparatus for blackout provisioning in a distribution network, the apparatus comprising:

provisioning logic configured to determine one or more affected regions of a blackout including a blackout interval;

a key generator configured to generate a blackout key based an original key and the one or more affected regions, wherein the original key is a digital rights management (DRM) key;

encryption logic configured to encrypt content with the blackout key to produce encrypted content; and a transmitter configured to transmit, during the blackout interval, the encrypted content and an encrypted version of the original DRM key over the distribution network, wherein said key generator is configured to generate the blackout key by processing the original DRM key and a list of the one or more affected regions with a message authentication code (MAC) algorithm to produce a working key encryption mask, and by determining the blackout key from a selected portion of the working key encryption mask.

8. The apparatus of claim 7, wherein said transmitter is configured to transmit a blackout message that associates the one or more affected regions with the encrypted content, including a blackout start time and a blackout end time of the blackout interval.

9. The apparatus of claim 7, wherein said transmitter is configured to transmit a key message that comprises the encrypted version of the original DRM key.

10. The apparatus of claim 7, wherein said provisioning logic is configured to determine the one or more affected regions from a provisioning message.

11. The apparatus of claim 7, wherein said provisioning logic is configured to determine the one or more affected regions based on a list of local operation infrastructures (LOIs).

12. The apparatus of claim 7, wherein said transmitter is configure to transmit the encrypted content and an encrypted version of the original DRM key during a selected blackout interval.

13. An apparatus for blackout provisioning in a distribution network, the apparatus comprising:

means for determining one or more affected regions of a blackout including a blackout interval;

means for generating a blackout key based an original key and the one or more affected regions, wherein the original key is a digital rights management (DRM) key;

means for encrypting content with the blackout key to produce encrypted content; and means for transmitting, during the blackout interval, the encrypted content and an encrypted version of the original DRM key over the distribution network, wherein said means for generating comprises:

means for processing the original DRM key and a list of the one or more affected regions with a message authentication code (MAC) algorithm to produce a working key encryption mask; and means for determining the blackout key from a selected portion of the working key encryption mask.

14. The apparatus of claim 13, further comprising means for transmitting a blackout message that associates the one or more affected regions with the encrypted content, the blackout message including a blackout start time and a blackout end time of the blackout interval.

15. The apparatus of claim 13, wherein said means for transmitting comprises means for transmitting a key message that comprises the encrypted version of the original DRM key.

16. The apparatus of claim 13, wherein said means for determining comprises means for determining the one or more affected regions from a provisioning message.

17. The apparatus of claim 13, wherein said means for determining comprises means for determining the one or more affected regions based on a list of local operation infrastructures (LOIs).

18. The apparatus of claim 13, wherein said means for transmitting comprises means for transmitting the encrypted content and an encrypted version of the original DRM key during a selected blackout interval.

19. A computer program product for blackout provisioning in a distribution network, comprising:

a non-transitory machine-readable medium comprising:

a first set of codes for causing a computer to determine one or more affected regions of a blackout including a blackout interval;

a second set of codes for causing a computer to generate a blackout key based on an original key and the one or more affected regions, wherein the original key is a digital rights management (DRM) key;

a third set of codes for causing a computer to encrypt content with the blackout key to produce encrypted content; and a fourth set of codes for causing a computer to transmit, during the blackout interval, the encrypted content and an encrypted version of the original DRM key over the distribution network, wherein said third set of codes is configured to cause a computer to generate the blackout key by processing the original DRM key and a list of the one or more affected regions with a message authentication code (MAC) algorithm to produce a working key encryption mask, and by determining the blackout key from a selected portion of the working key encryption mask.

20. The non-transitory machine-readable medium of claim 19, wherein said fourth set of codes is configured to cause a computer to transmit a key message that comprises the encrypted version of the original DRM key, the blackout message including a blackout start time and a blackout end time of the blackout interval.

21. The non-transitory machine-readable medium of claim 19, wherein said fourth set of codes is configured to cause a computer to transmit a key message that comprises the encrypted version of the original DRM key.

22. The non-transitory machine-readable medium of claim 19, wherein said first set of codes is configured to cause a computer to determine the one or more affected regions from a provisioning message.

23. The non-transitory machine-readable medium of claim 19, wherein said first set of codes is configured to cause a computer to determine the one or more affected regions based on a list of local operation infrastructures (LOIs).

24. The non-transitory machine-readable medium of claim 19, wherein said fourth set of codes is configured to cause a computer to transmit the encrypted content and an encrypted version of the original DRM key during a selected blackout interval.

25. At least one processor configured to perform a method for blackout provisioning in a distribution network, the at least one processor comprising:
a first module for determining one or more affected regions of a blackout including a blackout interval;
a second module for generating a blackout key based an original key and the one or more affected regions, wherein the original key is a digital rights management (DRM) key;
a third module for encrypting content with the blackout key to produce encrypted content; and
a fourth module for transmitting, during the blackout interval, the encrypted content and an encrypted version of the original DRM key over the distribution network,
wherein said third module is configured to generate the blackout key by processing the original DRM key and a list of the one or more affected regions with a message authentication code (MAC) algorithm to produce a working key encryption mask, and by determining the blackout key from a selected portion of the working key encryption mask.

26. The at least one processor of claim 25, wherein said fourth module is configured to transmit a blackout message that associates the one or more affected regions with the encrypted content, the blackout message including a blackout start time and a blackout end time of the blackout interval.

27. The at least one processor of claim 25, wherein said fourth module is configured to transmit a key message that comprises the encrypted version of the original DRM key.

28. The at least one processor of claim 25, wherein said first module is configured to determine the one or more affected regions from a provisioning message.

29. The at least one processor of claim 25 wherein said first module is configured to determine the one or more affected regions based on a list of local operation infrastructures (LOIs).

30. The at least one processor of claim 25, wherein said fourth module is configured to transmit the encrypted content and an encrypted version of the original DRM key during a selected blackout interval.

31. A computer-implemented method for blackout provisioning in a distribution network, the method comprising:
receiving a blackout message indicating that selected content has been blacked-out, the blackout message including an original key associated with the selected content and region identifiers, wherein the original key is a digital rights management (DRM) key;
determining if a selected region is identified in the blackout message;
indicating that the selected content is blacked out if the selected region is identified in the blackout message;
generating a blackout key from the original DRM key and the region identifiers in the blackout message; and
decrypting, using the blackout key, the selected content if the selected region is not identified in the blackout message,
wherein said generating the blackout key comprises:
using a message authentication code (MAC) algorithm;
processing the original DRM key and a list of the region identifiers with the MAC algorithm to produce a working key encryption mask; and
determining the blackout key from a selected portion of the working key encryption mask.

32. The method of claim 31, wherein said indicating comprises notifying a user that the selected content is blacked out.

33. The method of claim 31, wherein said determining comprises:
comparing a current operating region to region identifiers in the blackout message; and
determining that the selected region is identified in the blackout message if the current operating region matches at least one region identifier.

34. An apparatus for blackout provisioning in a distribution network, the apparatus comprising:
a receiver configured to receive a blackout message indicating that selected content has been blacked-out, the blackout message including an original key associated with the selected content and region identifiers, wherein the original key is a digital rights management (DRM) key;
processing logic configured to determine if a selected region is identified in the blackout message;
a user interface configured to indicate that the selected content is blacked out if the selected region is identified in the blackout message; and
decryption logic configured generate a blackout key from the original DRM key and the region identifiers in the blackout message, and to decrypt, using the blackout key, the selected content if the selected region is not identified in the blackout message,
wherein said decryption logic is configured to generate the blackout key by processing the original DRM key and a list of the one or more affected regions with a message authentication code (MAC) algorithm to produce a working key encryption mask, and by determining the blackout key from a selected portion of the working key encryption mask.

35. The apparatus of claim 34, wherein said user interface is configured to notify a user that the selected content is blacked out.

36. The apparatus of claim 34, wherein said processing logic is configured to compare a current operating region to region identifiers in the blackout message, and to determine that the selected region is identified in the blackout message if the current operating region matches at least one region identifier.

37. An apparatus for blackout provisioning in a distribution network, the apparatus comprising:
means for receiving a blackout message indicating that selected content has been blacked-out, the blackout message including an original key associated with the selected content and region identifiers, wherein the original key is a digital rights management (DRM) key;

means for determining if a selected region is identified in the blackout message;

means for indicating that the selected content is blacked out if the selected region is identified in the blackout message;

means for generating a blackout key from the original key and region identifiers in the blackout message; and means for decrypting, using the blackout key, the selected content if the selected region is not identified in the blackout message, wherein said means for generating the blackout key comprises:

means for using a message authentication code (MAC) algorithm;

means for processing the original DRM key and a list of the one or more affected regions with the MAC algorithm to produce a working key encryption mask; and means for determining the blackout key from a selected portion of the working key encryption mask.

38. The apparatus of claim 37, wherein said means for indicating comprises means for notifying a user that the selected content is blacked out.

39. The apparatus of claim 37, wherein said means for determining comprises:

means for comparing a current operating region to region identifiers in the blackout message; and means for determining that the selected region is identified in the blackout message if the current operating region matches at least one region identifier.

40. A computer program product for blackout provisioning in a distribution network, comprising:

a non-transitory machine-readable medium comprising:

a first set of codes for causing a computer to receive a blackout message indicating that selected content has been blacked-out, the blackout message including an original key associated with the selected content and region identifiers, wherein the original key is a digital rights management (DRM) key;

a second set of codes for causing a computer to determine if a selected region is identified in the blackout message;

a third set of codes for causing a computer to indicate that the selected content is blacked out if the selected region is identified in the blackout message; and a fourth set of codes for causing a computer to generate a blackout key from the original DRM key and region identifiers in the blackout message, and to decrypt, using the blackout key, the selected content if the selected region is not identified in the blackout message, wherein said fourth set of codes is configured to cause a computer to generate the blackout key by processing the original DRM key and a list of the one or more affected regions with a message authentication code (MAC) algorithm to produce a working key encryption mask, and by determining the blackout key from a selected portion of the working key encryption mask.

41. The non-transitory machine-readable medium of claim 40, wherein said third set of codes is configured to cause a computer to notify a user that the selected content is blacked out.

42. The non-transitory machine-readable medium of claim 40, wherein said second set of codes is configured to cause a computer to compare a current operating region to region identifiers in the blackout message, and to determine that the selected region is identified in the blackout message if the current operating region matches at least one region identifier.

43. At least one processor configured to perform a method for blackout provisioning in a distribution network, the at least one processor comprising:

a first module for receiving a blackout message indicating that selected content has been blacked-out, the blackout message including an original key associated with the selected content and region identifiers, wherein the original key is a digital rights management (DRM) key;

a second module for determining if a selected region is identified in the blackout message;

a third module for indicating that the selected content is blacked out if the selected region is identified in the blackout message; and a fourth module for generating a blackout key from the original DRM key and region identifiers in the blackout message, and decrypting, using the blackout key, the selected content if the selected region is not identified in the blackout message, wherein said fourth module is configured to generate the blackout key by processing the original DRM key and a list of the one or more affected regions with a message authentication code (MAC) algorithm to produce a working key encryption mask, and by determining the blackout key from a selected portion of the working key encryption mask.

44. The at least one processor of claim 43, wherein said third module is configured to notify a user that the selected content is blacked out.

45. The at least one processor of claim 43, wherein said second module is configured to compare a current operating region to region identifiers in the blackout message, and to determine that the selected region is identified in the blackout message if the current operating region matches at least one region identifier.

* * * * *